Jan. 2, 1934.  R. F. COHN  1,942,202
ROTATOR
Filed April 25, 1931
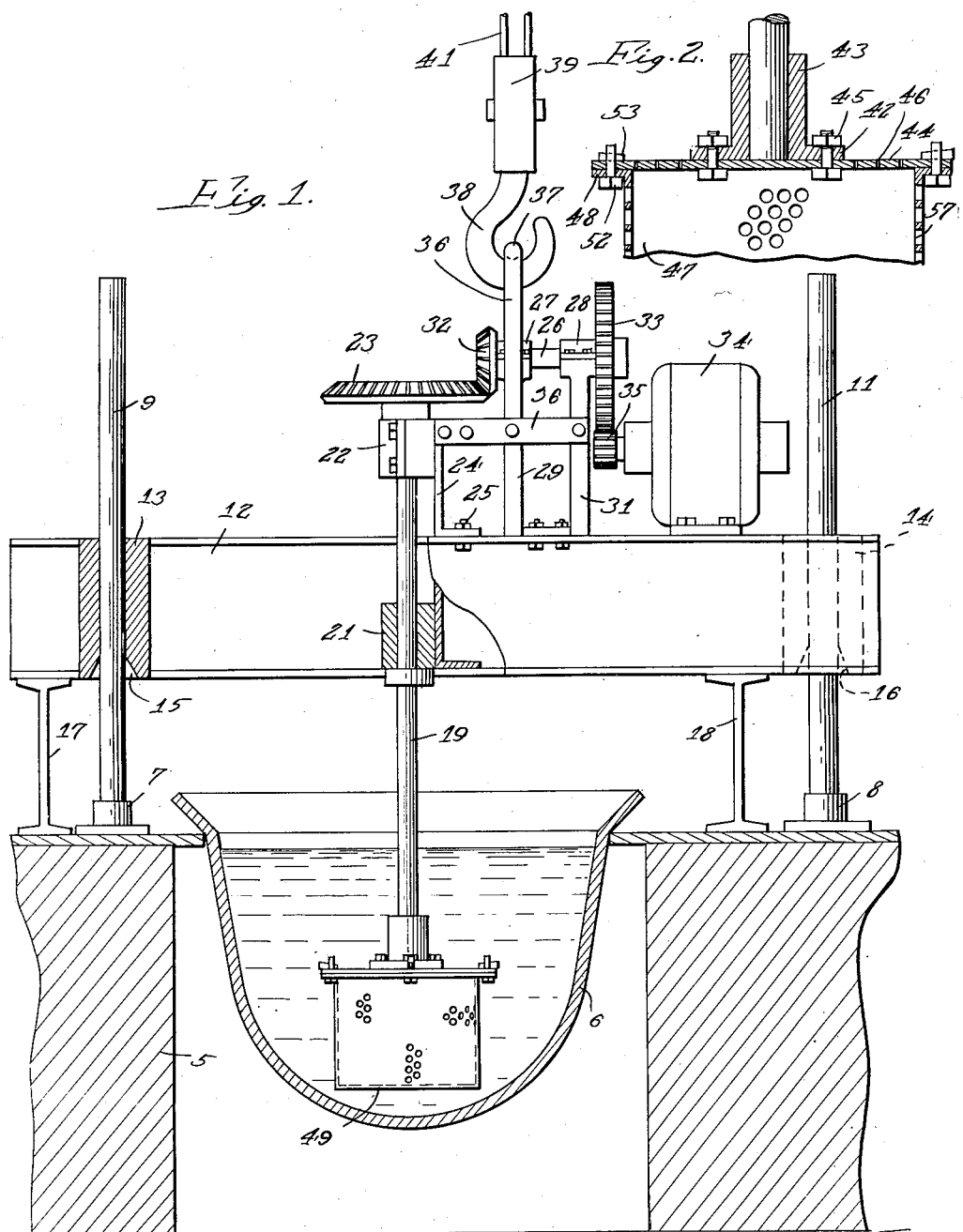

Patented Jan. 2, 1934

1,942,202

UNITED STATES PATENT OFFICE 1,942,202

ROTATOR

Ralph F. Cohn, Dixon, Ill.

Application April 25, 1931. Serial No. 532,877

5 Claims. (Cl. 75—15)

This invention relates to the treatment of liquids and has particular reference to a method and apparatus for treating a heavy liquid with a solid of low solubility or with a light solid of low solubility having a high rate of chemical reaction with air or the components thereof.

In many industrial processes, such, for example, as the treatment of non-ferrous metals with reagents for the separation of impurities therefrom, the reagents have a marked tendency to react with air or the components thereof, and are of lesser density than the material being treated so that they tend to remain on the surface and become lost through reaction with the air. A specific example of such a process is the Kroll process for the separation of impurities from lead by means of calcium, sodium, magnesium, and the like, wherein it is common to introduce metallic calcium into the molten lead. The calcium, being a highly reactive metal, tends to readily oxidize in contact with the air. This tendency increases as the temperature increases and consequently if the metallic calcium is merely thrown onto the molten lead, in the manner customarily employed for dissolving a solid in a liquid, the calcium will, because of its relatively lower density, float on the top of the molten lead and will thus be fully exposed to the oxidizing action of the air. In this manner a considerable portion of the calcium is completely lost to the process. Furthermore, the calcium, having a considerably higher melting point than lead tends to dissolve therein very slowly. The oxidizing action of the atmosphere proceeds at a higher rate of speed than the solution of the calcium in the lead. Even that portion of the calcium which does go into solution remains in the surface layer of the lead whereby an equilibrium is soon established further decreasing the rate of solution. If the molten lead is agitated with sufficient violence to maintain the calcium under the surface of the lead the oxidation of the latter is also increased by the inclusion of air in the molten mass by the violent agitation.

Numerous attempts have been made to satisfactorily solve this problem. Kroll, for example, evacuates the atmosphere or introduces an atmosphere of inert gas above the molten lead to prevent oxidation of the reagent as disclosed in U. S. Letters Patent 1,707,059. Because of this difficulty other inventors have introduced the calcium into the lead by decomposing a layer of calcium salt on the surface of the lead, thus depositing the calcium in the molten metal.

I have, therefore, aimed to provide a method of and means for dissolving a solid in a heavier liquid beneath the surface of the liquid.

Another object of the invention is to provide a method for dissolving a readily oxidizable solid in a heavier less readily oxidizable liquid.

I have further aimed to provide a method and means for dissolving a solid of low solubility in a liquid.

A further object of the invention is to provide means for simultaneously dissolving and mixing a light solid in a heavier liquid.

I have also aimed to provide perforate means for holding a quantity of a light solid submerged in a heavier liquid and means for rotating said perforate means for simultaneously dissolving the solid in the liquid and mixing the resultant mixture.

Other objects and attendant advantages will become apparent to those skilled in the art from the following description and the accompanying drawing in which—

Figure 1 is a vertical elevation partly in section showing my improved rotator; and Fig. 2 is a fragmentary enlarged view of the rotator basket and shaft.

The method consists in introducing the solid beneath the surface of the liquid in any suitable manner and holding it below the surface until dissolved in the liquid, either by true solution or by reaction with the liquid or components thereof. The solid is moved about in the liquid in order to constantly present it to the solvent action of fresh liquid whereby the rate of solution is greatly increased. The method is also useful in dissolving solids of difficult or slow solubility in liquids, in which case the rate of solution is materially increased.

Referring to the drawing, the numeral 5 designates a furnace setting and the numeral 6 a refining kettle of conventional design. Feet 7 and 8 are secured to the setting 5 and serve to support vertical guide pipes 9 and 11. A platform 12 may advantageously be, and in this instance is, formed of a steel I-beam. Brackets 13 and 14 are positioned on opposite sides of the platform 12 near opposite ends thereof and are provided with openings 15 and 16 to receive the guide pipes 9 and 11, the guide pipes and brackets acting to guide and stabilize the platform 12 in its vertical movement above the kettle 6. I-beams 17 and 18 are positioned on the setting 5 at opposite sides of the kettle 6 to serve as a rest upon which the platform 12 may be lowered to support the latter in spaced relation to the kettle during the normal operation of the device. A shaft 19 is vertically positioned in the platform 12 through a bearing 21, the lower end thereof extending downward a sufficient distance to rest within the kettle when the platform 12 rests upon the supports 17 and 18. The upper end of the shaft 19 is supported in a second bearing 22 and is provided with a ring gear 23 of conventional design fixedly secured thereto. An arm 24, secured to the platform 12 through bolts 25, serves to support the bearing 22. The ring gear 23 and the shaft 19 are driven from a horizontal shaft 26 supported in spaced bearings 27 and 28 positioned upon vertical arms 29 and 31, the arms serving to support the bearings upon the platform 12 and in spaced relation thereto. One end of the shaft 26 is provided with a pinion 32 cooperable with ring gear 23 while the opposite end of the shaft 26 is provided with a gear 33 of relatively large size. The gear 33 is driven by an electric motor 34 positioned upon the platform 12 and having a spur gear 35 cooperable with the gear 33. This gear train constitutes a gear reduction and quarter turn mechanism, whereby rotary motion is transmitted from the motor 34 to the shaft 19. Horizontal braces 36 serve to hold the arms 24, 29 and 31 rigidly in spaced relation. A lifting arm 36, secured to the platform 12 either as an integral part of the arm 29 or otherwise as desired, or as conditions dictate, is provided with an eyelet 37 at its upper end adapted to receive the hook 38 of a block 39 forming part of a crane lifting mechanism, cables 41 connecting the crane proper with the block 39. Thus by the operation of a crane functioning through the cable 41 and block 39 the platform 12 may be lifted upward or lowered as desired.

The lower end of the shaft 19 is provided with a flange 42 secured thereto by means of a sleeve 43, the sleeve being secured to the end of the shaft by any suitable or desired means. A plate 44 of suitable metal, preferably steel, is secured to the flange 42 by means of bolts and nuts 45, the plate 44 being provided with a plurality of small holes 46 preferably in the order of about ⅛th inch in diameter or smaller. The plate 44 forms the top of a rotator basket, the lower portion of the basket consisting of a perforate cylinder 47 having an outwardly extending flange 48 at the upper edge and a perforate cylindrical bottom 49, the cylinder and bottom preferably being made of steel or other suitable metal, depending somewhat upon the use to which the device is to be put. The openings 51 in the side walls and bottom of the basket are preferably somewhat larger than the openings 46 in the top plate, or in the order of about ½ inch in diameter. The side walls 47 are secured to the top plate 44 by means of bolts 52 passing through the flange 48 and the top plate 44 and having drift pins 53 for holding the parts together and quickly and conveniently assembling or disassembling the basket.

The rotator is adapted to be used for introducing material into a plurality of kettles such as herein designated by the numeral 6 and for this purpose may be lifted upward completely free of the guide pipes 9 and 11 by means of the cable 41 and transported to a similar second kettle for use. Material to be introduced into the liquid held in the kettle 6 is placed in the basket, preferably in the form of chips or the like and the basket assembled as already indicated. The platform 12 will be elevated by means of the cable 41 for this purpose. When the bolts 52 and drift pins 53 are suitably positioned the platform 12 may be lowered onto the supports 17 and 18 which will place the basket well into the liquid in the kettle 6. The motor 34 is then started bringing about rotation of the shaft 19 and the basket. The gearing train is arranged so as to impart a desired speed of rotation to the basket. This speed will depend somewhat upon the particular use to which the rotator is being applied. For example, for the introduction of metallic calcium into molten lead, a speed of about 70 R. P. M. is deemed advisable. By this rotation of the basket the liquid is drawn through the openings 51, into the cylinder, where it comes in contact with the solids to be dissolved and is then forced outward through the holes 46 in the plate 44. This circulation tends not only to rapidly dissolve the solid by constantly presenting it to the solvent action of fresh liquid but also serves to thoroughly mix the entire contents of the kettle so that when the solid is dissolved in the liquid the total volume of the liquid will be of uniform composition. In other words, the liquid which has dissolved a portion of the solid is thoroughly dispersed throughout the whole mass of liquid.

It will be observed that the entire dissolving and mixing operation is carried on beneath the surface of the liquid. When the solid being dissolved is lighter than the liquid the weight of the apparatus is sufficient to submerge the basket containing the solid, the plate 44 preventing the solid from escaping from the basket and rising to the surface of the liquid. The holes in the plate 44 should be of sufficient size to permit passage of the liquid but prevent the passage of any except very small particles of the solid. Since the mixing operation is carried on well beneath the surface, the solid being dissolved will not come into contact with the atmosphere at the surface of the liquid until it has become dissolved therein and consequently become so dilute that the action of the atmosphere upon it is negligible.

When materials are being employed which are very highly reactive with the atmosphere it may be desirable to place a layer of molten salt over the surface of the liquid in the kettle. Under these circumstances, it becomes highly important that during all of the dissolving and mixing operations, the layer of salt remained intact and unbroken. With the ordinary type of mixing operations this becomes very difficult, particularly, when solids lighter than the liquid are being dissolved, since under these circumstances it is necessary to agitate the mass violently, which tends to develop a vortex and break the layer of molten salt. However, with my improved device the rate of agitation need not be excessive and no conditions are developed which tend to break the salt seal.

The rotator is particularly applicable for introducing metallic calcium into molten lead, either for the production of calcium lead alloys or for the treatment of impure lead for the purpose of removing impurities. The calcium being lighter than the molten lead normally tends to float on the surface thereof, and, because of the relatively high temperature of the lead tends to very readily oxidize. Furthermore, because of its high melting point, it dissolves in the lead very slowly and consequently if merely added to the lead in the usual manner it is, in a large part, lost by oxidation. However, when introduced into the lead by means of the present invention very little, if any, loss by oxidation occurs and solution is relatively rapid. However, if the solid should be held beneath the surface without imparting suitable motion thereto or agitating the liquid the rate of solution is so low that it becomes impractical to dissolve the solid at the lower temperatures ordinarily found desirable in the art. Movement of the solid materially increases the rate of solution and brings about simultaneous solution and mixing.

The rotator is also beneficial in introducing high calcium content calcium lead alloys into impure lead for the purpose of removing impurities. These alloys tend to readily oxidize and have relatively high melting points whereby substantially the same difficulties are presented as in the case of metallic calcium.

The invention is also of value in dissolving difficult or slowly soluble solids in a liquid regardless of the densities or reactivities thereof. The solid being rotated in the basket is rapidly dissolved in the liquid with a minimum of energy consumption since the solid is moved with respect to the liquid. Numerous other examples could be given further describing the general utility of the invention but this is believed to be sufficient to convey a full, clear and complete understanding of the invention.

While I have described and illustrated a specific embodiment of my invention I am aware that numerous alterations and changes may be made therein without materially departing from the spirit of the invention and the scope of the appended claims in which I claim:

1. The method of treating molten lead, out of contact with air, with a lighter metallic solid having a low rate of solution which includes placing the solid as a plurality of pieces in a container having perforations of a number, size and character for the free circulation of the molten lead through and over the solid, submerging the container in the molten metal, and rotating the container to cause the metal to wash freely through the container to simultaneously dissolve the solid and mix the molten metal.

2. An apparatus for treating a liquid with a solid of lesser density which includes a basket having perforations and a top adapted to hold said solid in the form of small pieces and of a size and character to permit the substantially free circulation of liquid therethrough, a shaft for supporting said basket beneath the surface of liquid, and means for rotating said shaft to rotate said basket to circulate the liquid therethrough and dissolve the solid and to simultaneously impart a mixing swirl to the liquid.

3. An apparatus for treating a liquid with a solid which includes a horizontal platform, a vertical shaft supported upon said platform and depending therefrom, a perforate basket secured to the lower end of said shaft adapted to hold said solid, a motor arranged to drive said shaft to rotate said basket, means for moving said platform vertically between an operative position with said basket within said liquid and retracted positions, means for guiding said platform in vertical movement, and means for supporting said platform in its operative position.

4. In an apparatus for treating a liquid with a solid, a perforate basket comprising a top plate provided with openings sufficiently small to prevent passage of the particles of solid therethrough, side walls having relatively large openings therein adapted to permit the passage of liquid therethrough and substantially prevent the passage of solids, a flange on the upper edge of said side walls, means for fastening said flange to said top plate, and a bottom.

5. An apparatus for dissolving and obtaining a uniform distribution in a molten metal of a lighter, difficultly soluble solid out of contact with the air, comprising a perforate basket adapted to completely enclose and to hold the solid wholly therein in the form of pieces, a shaft for supporting the basket beneath the surface of the molten metal, and means for rotating the basket to impart circulation to the molten metal, the perforations being of a size and character to permit the free circulation of the molten metal through and over the solid whereby movement of the basket causes a free washing of the liquid against the solid to enhance solution and provide a circulation of the liquid to prevent localization.

RALPH F. COHN.